United States Patent [19]

Calandro et al.

[11] Patent Number: 4,756,921
[45] Date of Patent: Jul. 12, 1988

[54] BRAN EXTRUSION PROCESS

[75] Inventors: Thomas Calandro, Patterson; Robert Straka, Penquannock; Marsha Verrico, Fair Lawn, all of N.J.

[73] Assignee: Nabisco Brands, Inc., Parsippany, N.J.

[21] Appl. No.: 737,441

[22] Filed: May 24, 1985

[51] Int. Cl.4 .............................................. A23P 1/14
[52] U.S. Cl. ................................... 426/560; 426/620; 426/448; 426/449; 426/463
[58] Field of Search ............... 426/549, 560, 618, 619, 426/620, 452, 455, 456, 458, 459, 449, 450, 460, 461, 462, 463, 465, 466, 447, 448

[56] References Cited

U.S. PATENT DOCUMENTS

| | | |
|---|---|---|
| 897,854 | 9/1908 | Schluter .......................... 426/463 |
| 1,173,932 | 2/1916 | Cockrell . |
| 1,210,589 | 1/1917 | Black ................................ 426/560 |
| 1,244,586 | 7/1918 | Cockrell . |
| 1,263,609 | 4/1918 | Schuyler . |
| 1,271,139 | 10/1919 | Dickenson . |
| 1,564,181 | 12/1925 | Kellog ............................. 426/466 |
| 2,120,138 | 6/1938 | Mathews et al. . |
| 3,062,657 | 12/1958 | Vollink . |
| 3,458,321 | 7/1969 | Reinhart et al. ................. 426/463 |
| 3,554,763 | 1/1971 | Fast et al. ........................ 426/620 |
| 3,682,652 | 8/1972 | Corben ........................... 426/549 |
| 3,703,379 | 11/1972 | Cummisford . |
| 3,753,729 | 8/1973 | Harms et al. . |
| 4,217,083 | 8/1980 | Machuque . |
| 4,315,954 | 2/1982 | Kuipers et al. ................. 426/516 |
| 4,327,116 | 4/1982 | Weith . |
| 4,350,714 | 9/1982 | Duvall ............................ 426/559 |
| 4,418,088 | 11/1983 | Cantenot ........................ 426/448 |
| 4,431,674 | 2/1984 | Fulger et al. ................... 426/674 |
| 4,438,146 | 3/1984 | Colby ............................. 426/448 |
| 4,465,447 | 8/1984 | Cheigh et al. .................. 425/72 R |
| 4,497,840 | 2/1985 | Gould et al. .................... 426/560 |
| 4,500,558 | 2/1985 | Fulger et al. ................... 426/463 |

FOREIGN PATENT DOCUMENTS

| | | |
|---|---|---|
| 1122849 | 11/1978 | Canada . |
| 2401615 | 3/1979 | France . |
| PCT8610081 | 5/1986 | PCT Int'l Appl. . |
| 558141 | 2/1946 | United Kingdom . |
| 1156190 | 5/1978 | United Kingdom . |

Primary Examiner—Donald E. Czaja
Assistant Examiner—Carolyn Paden
Attorney, Agent, or Firm—Richard Kornutik

[57] ABSTRACT

A cereal is produced using bran and a continuous cooker. The continuous cooker is a twin screw extruder which blends and cooks dry ingredients with syrup, but without addition of water. The cooked mixture is then cooled by the injection of water into a cooling zone, which rapidly reduces the temperature and pressure of the material to be extruded. The cooled material, at a temperature of approximately 150° F.-280° F., dependent upon the formulation used, is extruded through a die head having a plurality of bores there-through. The extrudate strands expand only slightly, and have a roughened outer surface that is visible to the eye, and spontaneously break into strands almost entirely in the range of 0.5 inch to 4 inches. The strands are then dried and toasted, to form a bran cereal nuggets cereal.

10 Claims, 4 Drawing Sheets

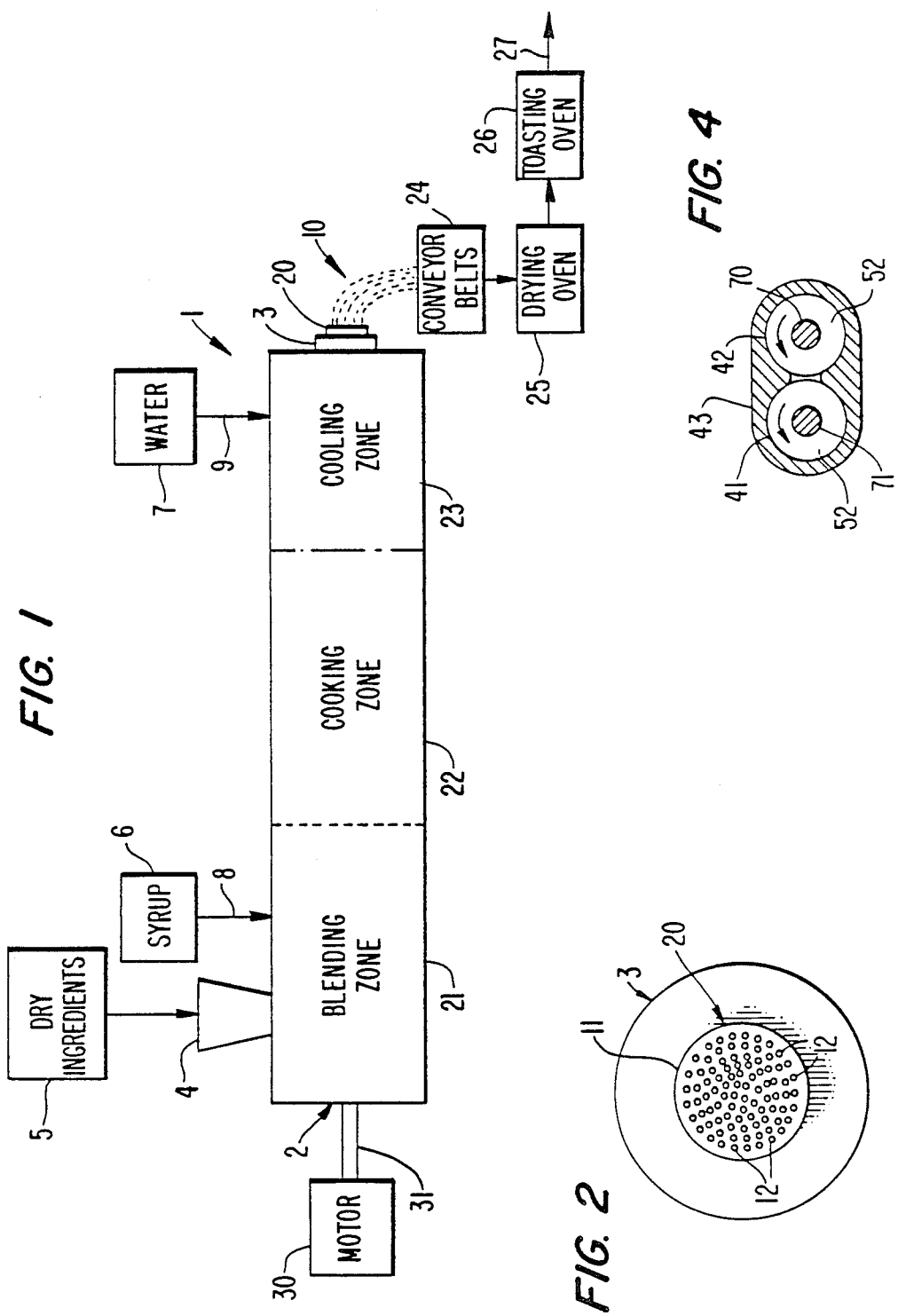

Photomicrograph (4.8x) of prior art 100% wheat bran nuggets.

Photomicrograph (4.8x) of 100% wheat bran nuggets produced according to the invention.

Photomicrograph (4.8x) of cereal nuggets
produced from corn and wheat bran mixture
according to the invention.

Actual size composite photograph of bran
cereal nuggets of Fig. 5 ("I", at top),
Fig. 6 ("II", at right) and Fig. 7 ("III",
at left).

BRAN EXTRUSION PROCESS

BACKGROUND OF THE INVENTION

This invention relates to a process for producing a bran cereal, an apparatus for producing a bran cereal, and a bran cereal product formed thereby.

It is well known to use an extrusion apparatus for extruding doughs. Several types of extruders are commercially available for use, including single screw extruders and twin screw extruders. Products so extruded are usually of the "expanded" variety although other product types are known as well. Several patents relating to use of bran for food products, and to use of extruders for producing food products, are discussed hereunder. Bran cereal nuggets, referred to hereunder, are commercially available as small bran pieces having a surface which is roughened.

The patent to Fulger et al, U.S. Pat. No. 4,500,558, dated Feb. 19, 1985, relates to modification of bran by extrusion. In this patent, hereinafter referred to as the '558 patent, a bran and water feed having a bran to water ratio of from 5.5:1 to 10:1 is extruded in a counter-rotating twin-screw extruder under high temperature and high shear conditions. The modified bran according to this process is made more readily millable and, when milled, possesses a "mouthfeel" with an absence of grittiness and a greater "functionality" in a food product.

As can be seen from the '558 patent, the combining of the feeds requires combining bran with water to form a feed having a bran to water ratio of from 5.5:1 to 10:1. This is a significant departure from the present invention, which does not include the combining of water to form a feed in this ratio. After the feed is combined, the next step of the patent requires introducing the feed into a counter-rotating twin screw extruder.

The next step disclosed is the extruding of the feed at a temperature of from 150° C. to 180° C. These temperatures are converted to degrees Fahrenheit for comparison to the present invention. In degrees Fahrenheit, the extruding step is conducted in a temperature range according to claim 1 of from 300° F.-356° F. This is in excess of the extruding point temperature range used in the present invention, and gives a different result as seen hereunder.

There is also recited in the '558 patent, a step of developing at the die a shear rate of from 500 to 2000 seconds$^{-1}$ in the extruder through which the feed is extruded.

In the specification of the '558 patent, at column 1 lines 33-37, it is stated that the invention relates to a "process for subjecting bran to a high temperature, high shear extrusion in a counter-rotating twin screw extruder which will modify the structure of the bran such that it becomes more readily millable."

Corn bran is mentioned in the '558 patent at column 3 at lines 6-11. Here, the corn bran is referred to as "wet milled corn bran". This further reinforces the teaching that the feed material must be wet upon entering, as claimed in this patent. Furthermore, with wet milled corn bran, the patent teaches in column 3 at lines 22-27 that wet milled corn bran is to be preblended with corn starch, which is necessary to produce a modified product, since attempts to produce a modified product without the starch failed. The attempts to modify the wet milled corn bran are mentioned in column 3 at lines 18-22.

The '558 patent also refers to milling steps which take place after the material exits the extruder. This is seen in column 3 at lines 28-45.

The brans which are taught as being usable in the '558 patent are listed in column 3 at line 49. These include corn, wheat, barley, rye, and combinations of all of these brans. Also, in column 3 of the patent, at lines 50-52, it is taught that these modified bran products can be used in various food products at a level of from 1% to 100% by weight.

In column 3 at lines 52-57 are enumerated such food products including breakfast cereals, expanded cereal products and cereal flakes, but not listing bran cereal "nuggets" products as producible thereby.

The '558 patent also refers to the extrudate as consisting of 70 pounds of small "puffed" material and 40 pounds of hard strips. At lines 51-53 it is taught that the "puffed" material is more desirable and was separated by a sieve. Both materials are then ground in a mill.

U.S. Pat. No. 4,438,146, to Colby et al, relates to a method for preparing cooked wheat products. Here, an apparatus and method for cooking wheat products is shown wherein the products are cooked by extrusion through an extrusion die. The extruder is similar to a conventional twin screw extruding device, and the die plates, shown in FIGS. 2, 3, and 5, cause extrusion of the wheat product into strands. Ground whole wheat is used and mixed with any desired dry ingredients. The cooked edible product is in expanded form. At column 3, at lines 1-3 it is taught that an extrusion aid or lubricant may be added to the dough to modify the extrusion pressures. The preferred extrusion lubricant is an edible oil or fat, the extrusion itself providing the heat necessary for the expansion. As seen in column 3 at lines 11-16, no external heat source is necessary, and because of steam vaporization upon extrusion, the die face itself is cooled so that the outer face of the die has a temperature at the range of 150° F. to 180° F. Water and/or moisture containing product is added to the other ingredients in the cooker, the water being present in a range of 14% to 18% by weight. It is taught in the '146 patent that the level of moisture is important in relation to the development of heat in the die and to the achievment of desired expansions. As taught in column 5 at lines 39-43, the heating and cooking of the dough is primarily done in the die itself. This is also taught in column 5 at lines 33-38, wherein it is stated that the heat generated during cooking in the die can require the temperature to be controlled such as with a water cooling jacket or the like around the body or barrel. Such cooling is to control the temperature range of dough entering the die to between ambient temperature (usually about 68° F.-84° F.) and about 180° F. It is also stated in column 5 at lines 27-29 that "cooking of the dough in the body or the barrel is not necessary and is to be minimized."

The dough, as taught in the '146 patent, in passing through the die generates heat sufficient to form steam and cook the dough enough to condition the gluten so that upon extrusion the dough expands in a desired form as determined by the die configuration. It is also taught that in the die itself the steam is superheated and reaches a temperature of about 250° F. The fluid friction generates the heat.

The die used in the '146 patent has three consecutive disc-shaped plates, each being drilled and tapped for mounting with one another upon the extruder. Another preferred die has only two disc-shaped plates.

The patent to Fulger et al, U.S. Pat. No. 4,431,674, relates to an all natural, ready-to-eat cereal derived from whole cereal grain. The process involves milling and separating the whole grain to produce several fractions, including a bran fraction, an endosperm fraction, and a germ fraction. The bran fraction and any bran material separated out from the ground germ is modified by high temperature, high pressure extrusion in a counter-rotating twin screw extruder.

In U.S. Pat. No. 3,682,652 to Corbin et al, a process for preparing a low calorie snack is taught. Here, corn or rice is mixed with water and then extruded under high pressure from the cooking section 13 to atmospheric pressure. Pressurized steam flashes off and inflates the starch mass to a matrix of tenderized dough which becomes firm with drying. Individual pieces are formed with a cut-off knife. The speed of the knives control the length of the pieces. A toaster-dryer is shown, as well as a cooling unit.

In U.S. Pat. No. 2,120,138 to Mathews et al, a method for producing extruded food products is taught. This patent teaches that heat can be supplied in an extruder through the frictional resistance afforded during the grinding and extruding operations, and that in some instances this heat is sufficient for cooking. This patent also relates to an expanded edible product.

In U.S. Pat. No. 3,703,379, issued to Cummisford et al, double expanded food products and a method for preparing same is taught. The food piece has large voids therein surrounded by thick walls. A secondary expansion such as by deep fat frying or the like causes additional puffing or expanding of the walls. Here, wheat flour and a lipid material is used for the dough.

In U.S. Pat. No. 3,458,321, to Reinhart et al, a method for extrusion cooking of food products is taught. Here, a twin screw extruder is used. The extruder has a feed section, a cooking section, a devolatilizing section, a metering section, and a die. At the devolatilizing section, water and heat are removed from the cooked material, the compressive force release causing moisture to flash from the cooked material and thereby cool and partially dry the cooked material, which is then extruded. A cereal grain such as corn flour or the like is used, in combination with sugar and other ingredients. The dry ingredients are mixed together with a liquid which includes a substantial portion of water. The mixing takes place within the twin screw cooking apparatus. Here, the mechanical forces of the twin screw extruder produce heat due to friction. The pressure applied to the food is taught as being over 1000 psi, and frequently several thousand psi. The food ingredient is gelatinized in the cooking section. Heat jackets are used around the casing 18. Cooling jackets can be used as well. The temperature range in the devolatization zone is approximately 200° F. to about 325° F. At the lower temperature, products are produced which are not puffed, while in the higher temperature range products are produced wherein some puffing has occurred. The temperature range in the metering zone F is between 105° F. and 240° F. The examples teach use of corn together with other ingredients including water. For example in example I of the '321 patent the water content raises the moisture to about 27% moisture by weight.

In U.S. Pat. No. 3,753,729, to Harms et al, a method for preparing food snack compositions is taught. In the patent, a process is taught using a particulate starch material having a specified abrasion rating in combination with a small proportion of an oleaginous material and water. This material is mixed and extruded under pressure at elevated temperature to form a puffed, ready-to-eat product.

In U.S. Pat. No. 897,854, issued to Schluter, Jr., a process for the production of digestible flour from bran is taught. Here, the bran is mixed with boiling water to form a thin pulp, the pulp being heated quickly to about 100° C., and then is dried at a low temperature at about 70° C. until solid. This solid is then ground into a flour.

Bran cereal nuggets are known, and are sold. Here, small nuggets or "buds" are formed which are composed of bran material. The bran material typically includes 100% wheat bran, although other bran materials can be used. However, in the prior art process, corn bran cannot be used to form the bran cereal nuggets. Each bud has a "fibrous" appearance, which provides a pleasant "mouthfeel". These bran cereal nuggets are also crispy and are chewable.

In the prior art process, a batch of ingredients including bran, flour, water, and other ingredients are mixed together with the flavor syrup, dumped onto a conveyor, processed by a grinder into strands, and then dried and toasted. The first step of this conventional process is the pressure cooking for one half hour of, for example, a 100 pound batch of wheat bran, 5% wheat flour, 7.5 pounds of an alternate flour and a flavoring material.

U.S. Pat. No. 1,173,932 (Cockrell) discloses a cereal breakfast food consisting of about 60 percent of wheat bran and the remainder corn meal and oats flour, the latter two items being added to make the bran more palatable. The bran is used for its laxative properties.

U.S. Pat. No. 1,210,589 (Black) discloses a bran biscuit or cake which contains shredded cereal and syrup for nutrition and to make the bran palatable. The shredded cereal can be corn, wheat or rice. About 37½ percent of bran is used in the formula. Black mentions that bran has laxative properties.

U.S. Pat. No. 1,244,586 (Cockrell) discloses a cereal breakfast food consisting of about 60 percent of wheat bran and the remainder corn meal, wheat and oats. The bran is used for its laxative properties.

U.S. Pat. No. 1,263,609 (Schuyler) discloses a self-rising pancake flour which contains ground rice bran, baking powder, wheat flour, soy flour, rice polish and salt. The mixture can include rice flour. The given example uses 22.5 percent of ground rice bran. The bran is used as a flavorant.

U.S. Pat. No. 1,271,139 (Dickerson) discloses a composition which includes bran (e.g., 15 percent), whole wheat flour, wheat flour, rye flour, etc. The composition is used to make biscuits.

U.S. Pat. No. 3,062,657 (Vollink) discloses an extrusion-cooked, ready-to-eat breakfast cereal flakes which can contain rice flour or bran. A moist comminuted starch-containing cereal mixture is passed through a cooker extruder, the expanded extrudate is tempered and then the cereal material is flaked and toasted. Example 2 uses a starting formula that includes 60 percent of ground whole wheat and 24 percent of bran.

U.S. Pat. No. 4,327,116 (Weith) discloses a bran bakery product from dough composed of 100 parts by weight of bran, 200 to 300 parts by weight of water and 2.5 to 15 parts by weight of carob bean flour (or other vegetable thickening agent). Other conventional dough ingredients such as flavoring agents can be used. Weith specifically mentions wheat bran and rye bran. The prior art section of Weith states that cereal fibers are used as casual therapy of obstipation and intestinal diseases.

U.S. Pat. No. 4,350,714 (Duvall) teaches a corn bran, extrusion-cooked, expanded cereal which further contains corn flour, oat flour, ground limestone, [i.e., $CaCO_3$], sugar, salt, soda, vitamin prefix and colorant. Duvall states that wheat flour and rice flour can be present. Example 1 shows the use of 25 percent of corn bran flour, and the claims recite that sufficient ground corn bran is used to provide 3.5 to 10 weight percent of fiber. The extruded pieces are enrobed in a syrup which includes sugar, coconut oil and water.

British Patent No. 1,561,190 (Weetabix) discloses a food mixture containing bran and a binding agent (starchy material or gum) mixed with water. The mixture is extrusion cooked. The mixture (on a dry basis) contains 10 to 95 percent of bran. The mixture can also contain wheat and rice flours.

German O.S. No. 2,837,294 (Bories et al.) discloses an extrusion cooked foodstuff composed of bran, 20 to 80 percent gluten, 5 to 20 percent, and the balance flour or starch, with the addition of 5 to 20 percent water after charging the mixture to an extruder.

Known foods containing bran include muffins and cereals, such as, All Bran, 100% Bran, Shreddies, Bran Flakes and Bran Crunchies. Wheat bran is found naturally in whole-wheat breads and cereals, can be bought separately for adding to other foods and is rich in dietary fiber.

SUMMARY OF THE INVENTION

By the present invention, bran cereal nuggets are formed for consumption as a cereal product by a continuous process.

By the present invention, bran cereal nuggets are produced which may be composed of any desired bran material, including wheat bran, rye bran, oat bran, and corn bran.

The present invention produces an edible cereal from bran material using an extrusion apparatus. In particular, a twin screw extruder is used to continously produce bran cereal nuggets.

The present invention produces an edible cereal in piece form, without use of a rotary knife or any other cutting means, the action of the die itself causing the extrudate to be formed into pieces.

The present invention relates to a process and apparatus for forming a bran product. Here, a twin screw food extrusion apparatus is used to process preblended dry ingredients, adding flavor and syrup a short distance downstream of the location where the dry materials have been added, mixing the materials, and adding water at the end of the mixing process, before a die head for extruding the bran product. The addition of the water at the end of the mixing process avoids forming a smooth-surfaced extrudate strand. Furthermore, the temperature conditions at the end of the twin screw apparatus are such that the addition of the water does not cause the extrudate to puff up due to flashing of the water into steam. Rather, the addition of water is just sufficient to cool the bran and thus reduce expansion and increase the viscosity of the extrudate, causing the extrudate to drag significantly against the die openings so as to form a rough textured surface, resulting in spontaneous formation of strands ranging from one to three inches in length.

The strands so formed are very similar in appearance to the bran products commercially sold having small piece size and roughened surfaces. The strands also have a bulk density preferably in a range of 15–15.5 lb/ft$^3$.

The present invention is highly advantageous in that it avoids batch-type processing and makes possible continuous processing, where the extruder can run continuously and receives ingredients continuously.

By the present invention, the need for a large amount of floor space and a large number of operators for the batch-type processing is eliminated, and a twin screw extruder alone, of any type (counter-rotating or parallel-rotating), can be used for the entire process, including the mixing, cooking, and forming of the bran product into individual roughened strands of the desired length. No cutting device is necessary in the present invention. The remaining post-extrusion prior art steps can remain the same, or can be changed if desired. That is, supplying the bran product to a dryer and thence to a toasting oven for control of the color and crispness of the final product can be employed if desired, or can be omitted or changed.

In the conventional type of extrusion apparatus used, a water jacket is used to selectively heat or cool the material in the extruder. No water injection step is used after the cooking zone in the conventional apparatus. In the prior art extrusion device, the extrudate cannot be sufficiently cooled by the water jacket to avoid producing an expanded, smooth-surfaced product. In the present invention, however, it is desired to rapidly cool the material in the extruder just before the die, in order to prevent any significantly large expansion of the material during extrusion due to flashing of water into vapor.

The final product in the present invention expands to approximately double its unexpanded volume, as measured by the bulk density.

In the present process, the dry ingredients are mixed by paddles, while syrup is preferably being added at 5–40 psig. After the mixing zone is a cooking zone, where heat is added as by a water or steam jacket adjacent the extrusion apparatus, so that cooking takes place at the range of 200°–400° F. In this cooking stage, starches are gelatinized, sugars are caramelized, and flavors are developed. An artificially sweetened version can also be made, if desired.

Following the cooking zone in the present invention is a region of lower temperature. The temperature in this region is about 200° F. initially, and drops to approximately 160° F. by the time the material reaches the die. The residence time in this zone is approximately 10 seconds, with mixing continuing in this region. However, the machine cannot perform the entire cooling, or even a significant amount of the required cooling, with the cooling jacket, since the residence time of the material is too short for the cooling jacket to be effective; therefore, direct water injection is used to cool the material after the cooking region to cause rapid cooling of the material in the extruder to about 160° F. at the die.

Drag occurs on the die at the die openings, due to the extrusion of an approximately 30% moisture product. The drag "tears up" the extrudate surface, causing the extrudate surface to roughen. The injection of the water in the zone preceding the die head, discussed above, also permits adjustment of the bulk density of the final extrudate product. For example, addition of water can raise the bulk density from, for example, 13.3 to 19 lbs/ft³. Here, the cooling water causes the lowering of the temperature and reduces material pressure and thus reduces the force of the expansion. As is well known, pressure increases with increasing temperature, where volume is kept constant. Also, as is well known, fluid viscosity generally increases when temperature is decreased. Viscosity tends to decrease when temperature is raised. Drag is strongly affected by the material's viscosity; drag generally increases as viscosity increases. The drag on the extrudate is also increased because of the lower temperature, since drag is influenced greatly by the viscosity.

For some prior art extrusion-type products, there is believed to be usually a pressure of 1000 p.s.i or more (to a maximum of approximately 2000 p.s.i) at the die plate. However, in the present invention, due to the addition of water for cooling, and the provision of an extra 3½ inches of head space between the screw extruder end and the die plate, the pressure at the die plate is only approximately 50-75 psig. This compares to die head pressures of 1,000 p.s.i or more in the prior art.

This relatively low pressure is also responsible in part for the reduced rate of expansion of the extrudate as compared to prior types of extrudates, since at 75 psig, there is not a drastic change in pressure of the product in reaching atmospheric pressure when passing from one side of the die to the other.

While wheat bran has been extruded in the past into bud-type products, corn bran has not. In the present invention, corn bran has been used to produce the extruded bran cereal nugget-type products. For use of corn bran, the pressure at the die head can be approximately 50-300 p.s.i. It is not yet known why the pressure required is slightly greater for corn bran than for wheat bran, although it is likely that the viscosity and chemical composition of corn bran, which is approximately 20% higher in dietary fiber than wheat bran, play a role.

For the 50 mm. screw bore machine (research size), the die has 73 holes. For a production-sized machine tested, a die head having 280 holes is preferably used. The die head itself has 280 holes therethrough and has strengthening ribs. Each hole has a diameter of 0.093 inches. The hole diameters can range from 0.01 inches to 0.140 inches. This permits use of a relatively thin die. A smaller head space compacts the material and would increase the pressure. Due to the nature of the bran material, viscosity becomes higher with a smaller head space and the bran tends to become too solid and compact to be extruded. The thin die would then be bent and blown out by the resultant high pressure. The use of such head space is a new step in the art. Other hole diameters tested include diameters of 0.088, 0.093, and 0.120 inches. The interior cavity of the die is approximately 2½ inches in diameter and approximately one inch in depth.

The water injection pressure at the last stage is approximately 30-100 p.s.i.g. The syrup is injected at nearly atmospheric pressure, or 5-40 p.s.i.g.

The extrusion apparatus itself is of a modular type, wherein modular elements are various screw types and paddle types. The conveying screws are used in series with paddles which mix and simultaneously selectively reduce or accelerate the rate of forward movement of the material in the extruder. The paddles can be arranged at varying angles of inclination to each other, typically at 45° or 60° angles to one another. These paddle zones, used for mixing, also cause a slowing-down of the forward advance of the mixture, and in the present invention a high shear screw, which also educes the rate of forward advance of material, is reduces. Reverse-angled paddles are also used in the cooking zone, with four forwardly advanced paddles being used and four reversely-positioned paddles being used, to hold the material in the cooking zone. Many paddle configurations are suitable. Three forward and three reverse-angled paddles are usable for the cooking zone, however two forward and two reverse-angled paddles can be used, as can other combinations of paddles be used as desired to provide more or less cooking, which can vary depending upon the formulation used. A smaller "push forward" screw is used after the cooking zone. It is contemplated as being within the scope of the present invention, however, to provide any desired configuration which is capable of mixing the ingredients and moving them to the die head under the conditions as described.

The high shear screw causes "severe" shear, holding the dough in and generating heat in the dough due to friction. Where an expanded product, as in the prior art, is to be made, most if not all of the screws are conveying screws, rather than use of many high shear screws or many mixing paddles. A smaller mixing zone is used in the prior art. For the prior art products, therefore, pre-blending of the water, syrup, and dry ingredients may be necessary. In the present invention, such pre-mixing is unnecessary, since no water (other than that water in the flavor syrup) is added to the dry ingredients until the cooling stage; only syrup is added before the cooling stage. The addition of water for cooling purposes before the die head would cause an excess of water in the final extruded product if water were to be included in a pre-mixed blend of ingredients at the ingredient feed region. Such excess water would cause expansion of the extrudate and would cause the extrudate to have an undesirable smooth outer surface.

According to Lineback et al., "Food Carbohydrates", (1982), page 296, there is not any completely satisfactory definition of the material which is generally referred to as fiber. The indigestible matter in animal feeds has always been designated as "crude fiber", and the term "dietary fiber" has been suggested for the plant cell wall constituents that are not digested by the secretions of the human digestive tract. The current definition of dietary fiber is not entirely satisfactory. There is a distinction between crude fiber and dietary fiber, since the former is a designation of a fraction determined analytically in a manner that gives an approximation of only cellulose and lignin and not of other cell-wall constituents not digested by man.

The substance that the lay public most readily equates with the term dietary fiber is wheat bran. Wheat bran is a heterogeneous substance which contains, in addition to fat and protein, at least 15 different minerals ranging from phosphorus and potassium at 1.04 and 1.38 percent, respectively, to iron (122 ppm), manganese (80 ppm), silicon (35 ppm) and selenium (0.1 ppm).

Dietary fibers (or roughage) have been consumed for their laxative properties.

The decreased intake of dietary fiber has been implicated as a factor in diseases such as cancer, diabetes and coronary disease. In the case of diabetes, increased dietary fiber definitely lowers plasma glucose and insulin levels. Data relating to heart disease and colon cancer are not as clear cut and must be assessed in the light of differences in total diet and lifestyle between populations at high and low risk. (Lineback et al., ibid., page 306.)

Prior art epidemiologic studies have identified a low intake of dietary fiber as one of the factors associated with an increased rate of cancer of the colon. Different methods of estimating fiber consumption have led in the art to different conclusions about its association with national mortality. Retrospective prior art studies designed to compare the dietary habits of colon cancer patients with controls have also failed to provide consistent evidence on the fiber hypothesis.

Concerning the incidence of colon cancer seen in industrialized populations which has been associated with lack of dietary fiber, the presence of fiber in the intestinal tract decreases transit time, which reduces contact time between potential carcinogens and the mucosa, and it dilutes the intestinal contents and thus reduces the possibility of interaction of procarcinogens with bacteria. Although some epidemiological data would appear to bear out the above stated hypothesis, some investigators, working from the same data base, have found little correlation between dietary fiber but a strong correlation with ingestion of animal fat. However, a high fiber diet is usually a low-fat diet and vice versa.

Experimental studies have shown that some kinds of fiber can protect against chemically induced cancer. Rats fed stock diets had fewer 2-acetylamino-fluorene-induced tumors than those fed semipurified diets. Colon cancer can be induced in rats by several compounds, including 1,2-dimethylhydrazine, methylnitrosourea and azoxymethane. Wheat bran has been found to protect rats against colon tumors induced by either injection [Fleiszer, D., et al., "Protective effect of dietary fiber against chemically induced bowel tumors in rats", Lancet 2, 552 (1978)] or oral administration of 1,2-dimethylhydrazine [Barbolt, T. A., et al., "The effect of bran on dimethylhydrazine-induced colon carcinogenesis in the rat", Proc. Soc. Exp. Biol. Med. 157, 656, (1978)]. In Watanabe, K., et al., "Effect of dietary alfalfa, pectin and wheat bran on azoxymethane or methylnitrosourea-induced colon carcinogenesis in F344 rats", J. Natl. Cancer Inst. 63, 141, (1970), rats were fed 15 percent alfalfa, pectin or wheat bran and the effects of an injected carcinogen (azoxymethane) in one group were compared with one administered by intrarectal instillation (methylnitrosourea) in another. Pectin and bran protected against azoxymethane-induced tumors but not against methylnitrosourea. Alfalfa did not affect the course of azoxymethane-induced tumors but significantly increased the incidence of methylnitrosourea-induced tumors. The data indicates that the action of dietary fiber was mediated by the mode of administration of the carcinogen.

Physiological effects of dietary fiber ought to be neither simple nor uniform, because the human gastrointestinal tract can accommodate to altered conditions and shows large variability in its actions. It has been postulated that beneficial effects of fiber in the large intestine include a binding and dilution of injurious substances. Although food remnants in the human large intestine are thought to provide little if any direct nutrition, they serve as substrates for microflora.

There are some potential disadvantages to the use of dietary fiber. Fiber-rich diets appear to induce malabsorption of minerals. Another potential hazard of fiber is in respect to reduced energy intake and protein utilization. Other possible deleterious effects of fiber such as persorption or volvulus of the sigmoid colon do not seem to be an immediate problem in populations ingesting normal, well-balanced diets.

Further details and advantages of the present invention appear from the following description of a preferred embodiment shown schematically in the drawings.

BRIEF DESCRIPTION OF THE DRAWINGS

FIG. 1 is a schematic side elevational view of an extrusion apparatus according to the present invention;

FIG. 2 is a front elevational view of a die head according to the present invention, shown schematically;

FIG. 4 is a view taken along line 4—4 of FIG. 3;

DETAILED DESCRIPTION OF THE INVENTION

Figure 3:
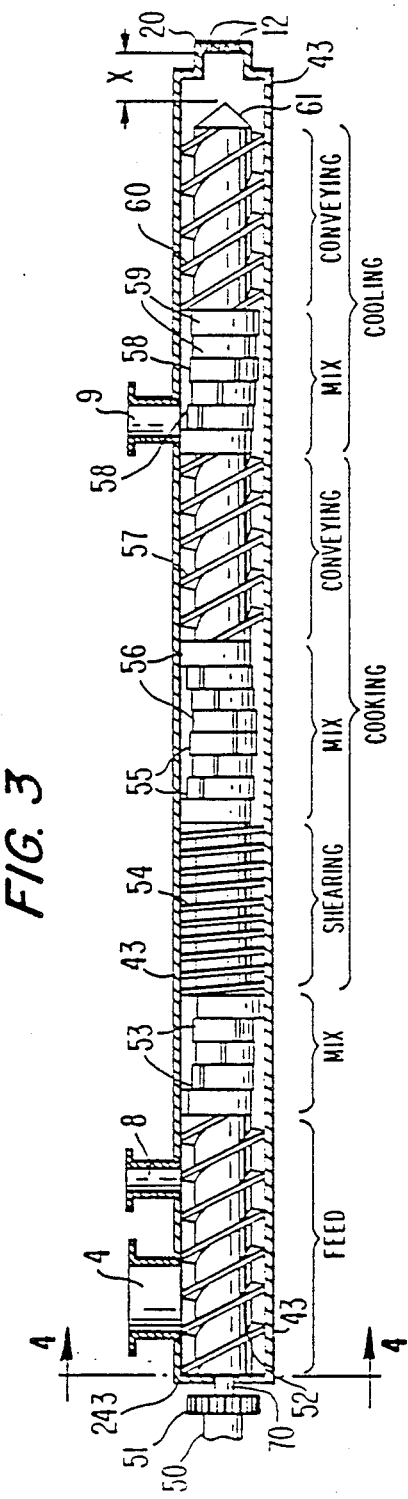
FIG. 3 is a side elevational view of one of the augers used in the present invention.

FIG. 1 shows a side elevational view of an apparatus 1 according to the present invention. The apparatus 1 includes a twin screw extruder 2, a die mounting block 3, a die head 20, and a funnel 4 for receiving ingredients.

Dry ingredients 5 are supplied to the funnel 4. Syrup 6 is supplied into a blending zone 21 of the extruder 2 by a conduit 8 shown schematically in FIG. 1.

A motor 30 drives a shaft 31 to drive the twin screws of the twin screw extruder 2. The syrup 6 and dry ingredients 5 are blended in the blending zone 21. These ingredients are then transported by the extruder 2 to a cooking zone 22, where the ingredients and syrup are cooked. The cooked material is then transported by the extruder 2 to a cooling zone 23. In the cooling zone 23, water 7 is injected through a conduit 9.

The material is then extruded through the die head 20 as extrudate 10, which falls into pieces. The extrudate 10 is conveyed by conveyor belt 24 to a drying oven 25, and thence to a toasting oven 26. The output 27 can be to packaging, storage, or to other locations. During movement of the pieces 10 in the drying oven, toasting oven and during transport of the pieces 10 to the drying oven and to the toasting oven, the extrudate pieces 10 break into smaller pieces, usually in the range of 0.5 to three inches in length.

FIG. 2 is a front elevational view of the die head 20 and the die head support block 3. The die head 20 has a flange 33, seen in dotted outline. The die head 20 has a plurality of orifices 12 therein. The die 11 has a plurality of supporting ribs, not seen in FIG. 2, which are disposed on the opposite side of the die head 11 to that shown in FIG. 2. These ribs strengthen the die. In a preferred embodiment, the die 11 has 73 holes, each hole having a diameter of 0.093 inches. The hole diameter is not critical, however, and any hole diameter can be used. For example, diameters of 0.120 and 0.88 inches have been used. Diameters in the range of, for example, 0.03 inches to 0.9 inches can be used. It is contemplated as being within the scope of the present invention, however, to include any number of holes in a die head. In another embodiment, for a larger machine, 280 holes would be used in the die head as another preferred embodiment. However, any number of holes can be used, and any diameter of holes can be used, depending upon: the composition of the material being extruded; the temperature of the extrudate; and the pressure of the extrudate acting upon the die head.

While circular die hole shapes have been discussed, it is contemplated as being within the scope of the present invention to use non-circular die head hole shapes, having cross-sectional shapes such as rectangular, oval, star-shaped, hexagonal, crescent, and any other cross-sectional shapes usable in a die.

FIG. 3 is a side elevational view of one of the shafts of the twin screw extruder, including the modular elements arranged thereon. The walls of the extruder are seen in sectional view, as are the walls of the inlets 4, 8, and 9.

As seen in FIG. 3, a driven shaft 50, shown partially broken away, drives a gear 51. The gear 51 in one type of apparatus drives the other screw of the twin screw assembly. It is, however, possible to independently drive each of the twin screws by separate motors in synchronous relationship, or by a single motor having a gearbox rather than a single gear pair 51.

A shaft 70, upon which the components are mounted in modular relationship, drives the screw. Each of the modular elements is keyed to the shaft 70. A casing 43 closely surrounds the twin screw apparatus, making possible the positive displacement of the material to be extruded.

A conveying screw 52 is seen, which intermeshes with an indentical conveying screw 52 mounted upon the other shaft (not seen). In this region, the dry ingredients are supplied to the funnel 4, and the syrup is supplied to the inlet 8. This is labeled as the "feed" region in FIG. 3.

In a mixing region of FIG. 3, adjacent paddles 53 on each shaft 70 are oriented at 45 degree angles to one another in a circular progression along the length of the shaft 70, which serve to interact with corresponding paddles on the other screw of the twin screw extruder 2. The paddles of the other shaft (not shown) are arranged similarly, but are oriented at a different angle initially so that the paddles 53 wipe corresponding paddles of the other shaft 70 during operation to force positive material displacement through the extruder, as is well known in the twin screw extruder art. There are five paddles 53 shown in FIG. 3, however varying numbers of paddles as well as varying types and lengths of screws can be used to produce a satisfactory product. The present embodiment shows one preferred embodiment.

After the first mixing zone, the dry ingredients 5 and syrups 6, now mixed together, are transported to a cooking zone. In this cooking zone, mechanical heat generated due to friction and fluid shear elevates the temperature of the materials to approximately 200°–400° F. for cooking. No external heat need be added, although the apparatus available has auxiliary equipment suitable for supplying heating or cooling to this zone as well as to the other zones. The auxiliary heating or cooling is used to control barrel temperatures to maintain predetermined temperature settings.

A high shear screw 54 is seen in a "high shear" region of the cooking zone. This screw 54 has a narrow lead and pitch, and causes increased pressure to exist in the material to be extruded. A corresponding high shear screw 54 is located on the other screw of the twin screw extruder 2, for engagement with the high shear screw 54 shown in FIG. 3, to cause positive displacement of the material to be extruded.

Following the "high shear" region is a "mix" region of the cooking zone. Here, four paddles 55 are arranged at 45 degree angles along a circular direction. Four additional paddles 56 are arranged in an opposite circular direction, at 45 degree angles to one another, to aid in retaining the material in the cooking zone. This also causes a pressure build-up in the material.

Following the "mix" region of the cooking zone is a conveying screw 57. As with the other elements, the paddles 55, 56, and 57 all have corresponding mating elements mounted on the other one of the two twin screws of the extruder 2. This results in positive displacement of the material to be extruded, which positive displacement does not depend upon the amount of material upstream of any particular location in the barrel 43.

The conveying screw 57 conveys the material to a cooling zone. In the cooling zone, four paddles 58 are provided at 45 degree angles to one another for mixing the material with water 7 supplied through the conduit 9. Directly following the paddles 58 are a pair of paddles 59 which are oriented at 90 degree angles to one another. The paddles 59 cause increased blending of the water and the material. As with the other elements, corresponding mating paddles 58, 59 are provided on the other one of the two twin screw extruder shafts 70, which wipe the opposing paddles 58, 59 as is well known in the art.

A conveying screw 60 is located in a conveying region of the cooling zone. The conveying screw 60 conveys material to the tip 61 of the screw 60. A distance X exists between the tip 61 and the die head 20. In the preferred embodiment, this distance is 3½ inches. This permits use of a relatively thin die. A smaller head space compacts the material and would increase the pressure. Due to the nature of the bran material, viscosity becomes higher with a smaller head space and the bran tends to become too solid and compact to be extruded. The thin die would then be bent and blown out by the resultant high pressure. The use of such head space is a new step in the art. Other hole diameters tested include diameters of 0.088, 0.093, and 0.128 inches. The die head 20 is seen in sectional view in FIG. 3, and several of the passages 12 are shown in this figure.

Several types of twin screw extruders have been found to be suitable in the present invention. One of these is a Baker Perkins twin screw multi-purpose food extrusion system, model no. MPF-50D. This model has a clam shell casing arrangement and has modular screw and paddle elements. This apparatus has cooling and heating capabilities for supplying external heat and for supplying cooling externally to the casing 43. Another type of twin screw food extruder found suitable for use in the present invention is by Wenger, model WENGER TX. Still another type of twin screw extruder found suitable for use in the present invention is by Werner Pfleiderer's. In the Baker Perkins line, other models suitable for use are models MPF80 and MPF80-L.

The dry ingredients 5 are supplied to the funnel 4 at ambient pressure. The syrup 6 is supplied in a range usually of 5–40 psi, and the water 7 is supplied through the conduit 9 at a pressure of approximately 50–100 psi. The pressures involved depend upon the particular material being extruded. In the present invention, bran is the preferred material. Wheat bran or corn bran can be used, with the operating conditions changing depending upon the type of bran used. The syrup flow 6 is in a range of 2–8 lb/min., and the water flow is in a range of 0.3–0.6 lb/min. The syrup is in a range of approximately 40%–80% solids ("brix"). The final dried, toasted extrudate product has a bulk density in a range of 13–20 lb/ft$^3$.

Dietary fibers are widely distributed in unrefined cereals, fruits and vegetables. The invention is concerned with the form of dietary fibers known as cereal bran. Cereal bran contains cellulose, hemicelluloses, and lignin. The composition and characteristics of bran are dependent on the cereal source, plant variety, and the milling practices. Wheat bran is readily available from any flour mill. Cereal bran is the husk hull or outer covering of the cereal grains, so the cereal grain must have an outer hull. Frequently, different wheat varieties are blended to give the desired flour properties. In addition, varying amounts of the wheat endosperm components will be present and the particle size will also depend on which break roll the bran is taken. Wheat bran contains large quantities of arabinoxylans, considerable lignin and some starch in addition to cellulose. Cereal grains are members of the grass family, gramineae, that are grown for their edible grains. The invention can use cereal brans of, for example, wheat, rye, corn (maize), barley, oats, rice and grain sorghum.

There are two general classes of products provided by a wheat mill, namely, flour and millfeed. These two general classes are subdivided into products depending upon the degree of purity desired. The subclasses for straight flour are patent flour (less than 70 percent of wheat) and clear flour (residue left when a patent flour is removed from a straight flour). The subclasses for millfeed are bran (seed coat material left after milling flour), germ (wheat seed embryo) and shorts (everything left after the bran and germ have been removed from millfeed).

Wheat bran typically contains 9.2 to 11.6 percent of crude fiber, 3.0 to 4.2 percent of dietary fiber, 4.6 to 7.2 percent of starch, 4.7 to 7.1 percent of ash and 4.7 to 7.1 percent of protein (N×5.7). With wheat grains: the pericarp, or dry fruit coat, which corresponds roughly to the shell of a nut, consists of four outer bran layers (epidermis, hypodermis, cross cells, and tube cells); and the remaining tissues, the inner bran (seed coat and nucellar tissue), endosperm, and embryo (germ) comprise the seed proper. The vitamin content of wheat bran is typically:

| Vitamin | mg per 100 g, dry weight |
| --- | --- |
| thiamine | 0.730 |
| riboflavin | 0.387 |
| niacin | 26.2 |
| biotin | 0.051 |
| choline | 179.0 |
| pantothenic acid | 4.54 |
| folic acid | 0.102 |
| inositol | 1554.0 |
| p-aminobenzoic acid | 1.72 |

The mineral contant of wheat bran is typically:

| Mineral | Bran |
| --- | --- |
| potassium, % | 1.67 |
| phosphorus, % | 1.57 |
| magnesium, % | 0.688 |
| calcium, % | 0.128 |
| sodium, ppm | 30.6 |
| zinc, ppm | 99.4 |
| iron, ppm | 141.3 |
| manganese, ppm | 136.5 |
| copper, ppm | 15.2 |
| molybdenum, ppm | 0.83 |
| cobalt, ppm | 0.109 |

Sorghum bran typically contains 34.6 percent of starch, 5.2 to 7.6 percent of protein, 3.7 to 6.0 percent of fat and 2 percent of ash. Rice is a covered cereal; in the threshed grain (or rough rice), the kernel is enclosed in a tough siliceous hull. When this hull is removed, the kernel (or caryopsis), comprising the pericarp (outer bran) and the seed proper (inner bran, endosperm, and germ). Corn bran (or pericarp) typically contains 3.5 to 10.4 percent of starch, 0.7 to 1.2 percent of fat, 2.9 to 3.9 percent of protein and 0.29 to 1.0 percent of ash. In preventive medicine, it seems that bran fiber has two major functional properties, namely, (1) absorption capacity and (2) water-binding properties. For example, wheat bran absorbs two times its weight in water.

The following examples illustrate formulations and operating conditions for several representative products produced by the present invention, each product including bran cereal nuggets having the characteristic roughened surfaces, good mouthfeel, palatable texture, and which are readily chewable.

EXAMPLE I

Dry ingredients: raw wheat bran (no other dry ingredients used)

The dry ingredients form 56.72% by weight of the total materials added to the apparatus.

The syrup or liquid formula used forms 38.07% of the total materials added to the apparatus, and includes the following:

| Syrup (liquid formula) ingredients | % of total materials by weight |
| --- | --- |
| liquid sucrose | 29.84% |
| fig juice | 0.67% |
| prune juice | 0.67% |
| salt | 1.53% |
| malt syrup | 1.75% |
| water | 3.01% |
| vitamin premix | 0.60% |

Added downstream water: 5.21% by weight of total materials added to the apparatus.

The flow rates are as follows: dry ingredients (raw wheat bran) flows at 4.75 lb./minute; the syrup flows at 3.2 lb./minutes; and the added downstream water flows at 0.5 lb./minute into the apparatus. The extruder is operated at 400 r.p.m. at 52% of full motor load. The extruder output rate is 8.25 lb./min., actual value, as opposed to the theoretical value (by summing the weights of the input materials) of 8.45 lb./min. The material difference is due to vaporized liquid leaving the extrudate, in this example being 0.20 lb./minutes.

The extruder used has five temperature zones, as is well-known in the extruder art, with zone 1 being nearest the dry ingredient feed location, and with zone 5 being nearest the die head. The zone temperatures in this example are: Zone 1=113° F.; Zone 2=132° F.; Zone 3=192° F.; Zone 4=219° F.; and Zone 5=203° F. The zone temperatures fluctuate 2°-3° F. during operation, and the temperatures given represent average values obtained during a trial run. The die temperature is 180° F., the die not being externally heated or cooled in this example. The pressure at the die head is 60 p.s.i.g. The dried product bulk density is in the range of 15–15.5 lb./ft$^3$.

EXAMPLE II

Dry ingredients: raw wheat bran (no other dry ingredients used).

The dry ingredients form 55.84% by weight of the total materials added to the apparatus.

The syrup or liquid formula used forms 35.03% of the total materials added to the apparatus, and includes the following:

| Syrup (liquid formula) ingredients | percent of total materials, by weight |
|---|---|
| liquid sucrose | 15.00% |
| fig juice | 0.67% |
| prune juice | 0.67% |
| salt | 0.00% |
| malt syrup | 0.50% |
| water | 17.59% |
| vitamin premix | 0.60% |

Added downstream water: 9.13% by weight of total materials added to the apparatus.

The flow rates are as follows: dry ingredients (raw wheat bran) flows at 4.75 lb./minute; the syrup flows at 3.0 lb./minutes; and the added downstream water flows at 0.8 lb./minute into the apparatus. The extruder is operated at 400 r.p.m. at 47% of full motor load. The extruder output rate is 8.30 lb./min., actual value, as opposed to the theoretical value (by summing the weights of the input materials) of 8.55 lb./min. The material difference is due to vaporized liquid leaving the extrudate, in this example being 0.25 lb./minutes.

The extruder used has five temperature zones, as is well-known in the extruder art, with zone 1 being nearest the dry ingredient feed location, and with zone 5 being nearest the die head. The zone temperatures in this example are: Zone 1=104° F.; Zone 2=130° F.; Zone 3=193° F.; Zone 4=204° F.; and Zone 5=194° F. The zone temperatures fluctuate 2°-3° F. during operation, and the temperatures given represent average values obtained during a trial run. The die temperature is at 161° F., the die not being externally heated or cooled in this example. The pressure at the die head is 60 p.s.i.g. The dried product bulk density is in the range of 15–15.5 lb./ft$^3$.

EXAMPLE III

Dry ingredients: raw wheat bran=52.25% by weight of total material added to the apparatus; and milled wheat flour=2.0% by weight.

The total dry ingredient weight=54.25% by weight of the total material added to the apparatus.

This example shows use of a binder (wheat flour) which is used to adjust final product texture, taste, and bulk density.

The syrup or liquid formula used forms 39.87% of the total materials added to the apparatus, and includes the following:

| Syrup (liquid formula) ingredients | % of total materials by weight |
|---|---|
| liquid sucrose | 22.39% |
| fig juice | 0.67% |
| prune juice | 0.67% |
| salt | 0.00% |
| malt syrup | 1.75% |
| water | 13.79% |
| vitamin premix | 0.60% |

Added downstream water: 5.88% by weight of total materials added to the apparatus.

The flow rates are as follows: dry ingredients (raw wheat bran) flows at 4.60 lb./minute; the syrup flows at 3.40 lb./minutes; and the added downstream water flows at 0.5 lb./minute into the apparatus. The extruder is operated at 400 r.p.m. at 52% of full motor load. The extruder output rate is 8.40 lb./min., actual value, as opposed to the theoretical value (by summing the weights of the input materials) of 8.50 lb./min. The material difference is due to vaporized liquid leaving the extrudate, in this example being 0.10 lb./minutes.

The extruder used has five temperature zones, as is well-known in the extruder art, with zone 1 being nearest the dry ingredient feed location, and with zone 5 being nearest the die head. The zone temperatures in this example are: Zone 1=114° F.; Zone 2=148° F.; Zone 3=212° F.; Zone 4=233° F.; and Zone 5=206° F. The zone temperatures fluctuate 2°-3° F. during operation, and the temperatures given represent average values obtained during a trial run. The die temperature is at 157° F., the die not being externally heated or cooled in this example. The pressure at the die head is 60 p.s.i.g. The dried product bulk density is in the range of 15–15.5 lb./ft$^3$.

EXAMPLE IV

Dry ingredients: raw wheat bran=70% by weight of the dry ingredient total weight; wheat bran=25% by weight of the total dry ingredients; and Aytex P (a commercial wheat starch)=5% by weight of the total dry ingredient weight.

The dry ingredients form 54.25% by weight of the total materials added to the apparatus. This example illustrates use with no sugar added.

The syrup or liquid formula used forms 39.88% of the total materials added to the apparatus, and includes the following:

| Syrup (liquid formula) ingredients | % of total materials by weight |
| --- | --- |
| liquid sucrose | 0.00% |
| flavor ingredient (molasses, food flavoring, cinnamon, or other flavors) | 1.48% |
| salt | 1.48% |
| malt syrup | 2.97% |
| water | 33.65% |
| vitamin premix | 0.30% |

Added downstream water: 5.87% by weight of total materials added to the apparatus.

The flow rates are as follows: dry ingredients (raw wheat bran) flows at 4.60 lb./minute; the syrup flows at 3.4 lb./minute; and the added downstream water flows at 0.5 lb./minute into the apparatus. The extruder is operated at 400 r.p.m. at 60% of full motor load. The extruder output rate is 8.30 lb./min., actual value, as opposed to the theoretical value (by summing the weights of the input materials) of 8.50 lb./min. The material difference is due to vaporized liquid leaving the extrudate, in this example being 0.20 lb./minutes.

The extruder used has five temperature zones, as is well-known in the extruder art, with zone 1 being nearest the dry ingredient feed location, and with zone 5 being nearest the die head. The zone temperatures in this example are: Zone 1=117° F.; Zone 2=150° F.; Zone 3=189° F.; Zone 4=211° F.; and Zone 5=212° F. The zone temperatures fluctuate 2°-3° F. during operation, and the temperatures given represent average values obtained during a trial run. The die temperature is at 162° F., the die not being externally heated or cooled in this example. The pressure at the die head is 70 p.s.i.g. The dried product bulk density is in the range of 15-15.5 lb./ft$^3$.

FIG. 4 is a view taken along line 4—4 of FIG. 3. Here, a pair of shafts 70, 71 are shown, both rotating in the same direction. This is known as a "co-rotating" twin screw arrangement. However, the present invention can be used with a counter-rotating apparatus as well. In counter-rotating twin screw extruders, the conveying and high shear screws of each barrel have opposing left-hand and right-hand orientations. In a co-rotating arrangement, both barrels Contain Elements having the same orientation, that is, both barrels have left handed screw threads, or else both are right handed screw threads.

The barrel 43 closely fits the external periphery of screw elements 52, 52. The directions of rotation are shown by arrows in FIG. 4. All of the rotating elements pass closely adjacent at least a portion of the interior of the barrel 43, to produce a positive material displacement.

Figure 5:
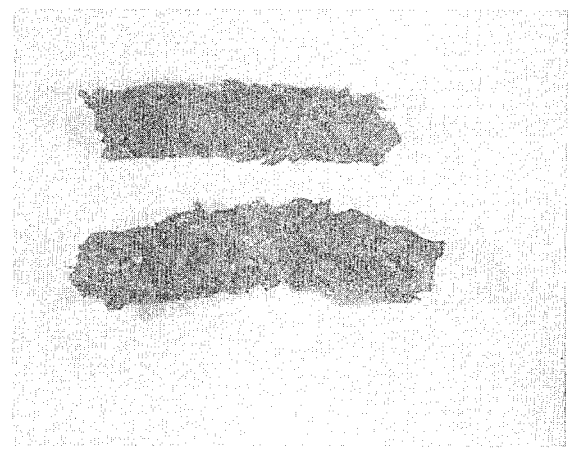
FIG. 5 is a photomicrograph of two prior art bran cereal nuggets enlarged 4.8 diameters.

FIG. 5 is a photomicrograph of conventional bran "cereal nuggets" as produced by the prior art process. This product is available commercially as Nabisco ® 100% Bran Cereal. The enlargement is 4.8 diameters. Wheat bran is used. Two such bran cereal nuggets are shown. As can be seen, the surface is roughened in appearance.

Figure 6:
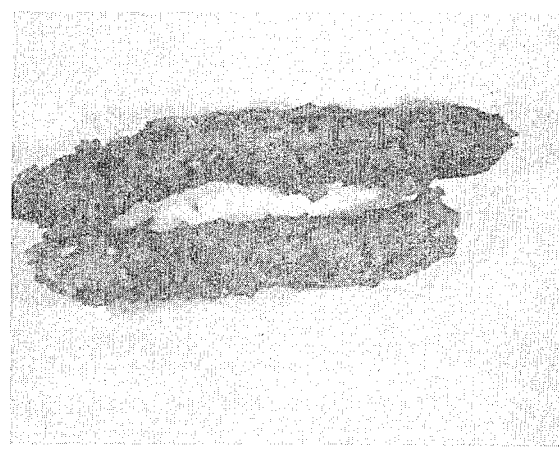
FIG. 6 is a photomicrograph of two wheat bran cereal nuggets, enlarged 4.8 diameters produced by the process of the present invention.

FIG. 6 is a photomicrograph of a product produced according to the present invention.

Figure 7:
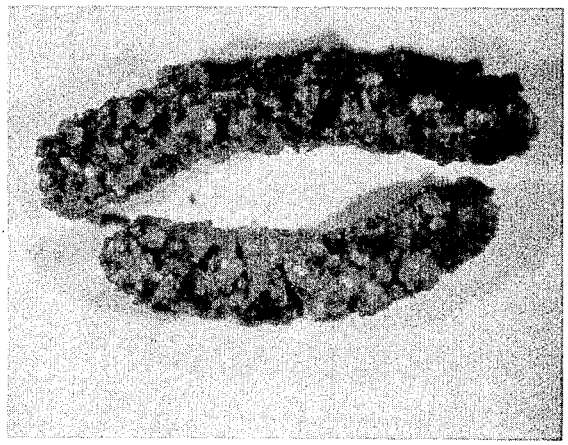
FIG. 7 is a photomicrograph of two corn bran cereal nuggets, enlarged 4.8 diameters, produced by the process of the present invention.
Figure 8:
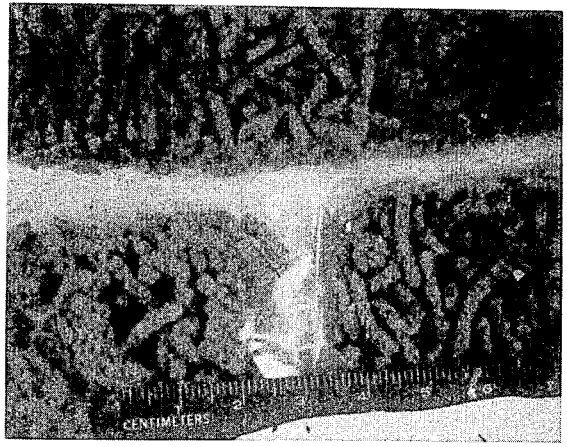
FIG. 8 is a photograph of a plurality of bran cereal nuggets, reproduced to actual size, with the prior art 100% bran cereal nuggets at the top, the wheat bran cereal nuggets of FIG. 6 at the right, and the corn bran cereal nuggets of FIG. 7 at the left.

FIG. 7 is a photomicrograph of a novel corn bran cereal nuggets product, produced according to the present invention. The enlargement shown is 4.8 diameters. Two corn bran cereal nuggets are shown. Each corn bran cereal nugget is composed of raw corn bran mixed with wheat bran, the corn bran being approximately 70% by weight of the total dry ingredients. In the prior art, it has not been possible to produce corn bran cereal nuggets, and further it has not been possible to produce a corn bran cereal nuggets having a roughened surface texture. As seen in figure 8, corn bran cereal nuggets produced have a roughened surface texture. It is believed that corn bran has not heretofore been processed into cereal bran nuggets since it is so coarse that prior art processes cannot adjust to the required pressure increase, and because a product so produced would be "gritty" (sandy), and because the product cannot be expanded due to the fact there is little or no available starch for permitting expansion.

Figure 9:
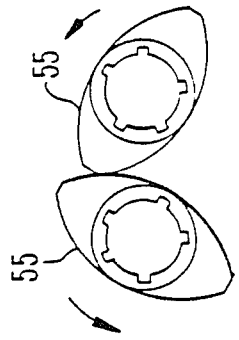
FIG. 9 is a front elevational view of a paddle used in the present invention.

FIG. 8 is a photograph of a plurality of each of the types of bran cereal nuggets shown in FIGS. 5, 6, and 7. The photograph depicts the bran cereal nuggets at actual size. The wheat bran cereal nuggets of FIG. 5, representing the prior art bran cereal nuggets, are at the top of the photograph in FIG. 8, and are labeled "I". The wheat bran cereal nuggets of FIG. 6, representing the wheat bran cereal nuggets of the present invention, are at the lower right-hand portion of the photograph in FIG. 9 are are labeled "II". The corn bran cereal nuggets of FIG. 7, representing the corn bran cereal nuggets of the present invention, are at the lower left-hand portion of the photograph in FIG. 8 and are labeled "III". As can be seen in FIG. 8, each of the bran cereal nuggets has a roughened appearance. This roughened appearance is desirable since it conveys the impression to an observer of an edible cereal having a high fiber content. Also, the roughened surface texture contributed to a good "mouthfeel".

The bran cereal nuggets shown in FIG. 8 are easily chewable due to their reduced bulk density and physical structure. If the bulk density were increased, the product would be solid and similar to hard spaghetti in that it would not be readily chewable. Furthermore, the somewhat porous structure of the bran cereal nuggets permits facile absorption of liquids. This is desirable for use in a cereal, since cereals are often consumed together with a liquid such as milk or water.

FIG. 9 is a front elevational view of a paddle 53 used in the present invention. The paddle 53 has a plurality of slots 153 therein, for keying to one of the shafts 70, 71.

Figure 10:
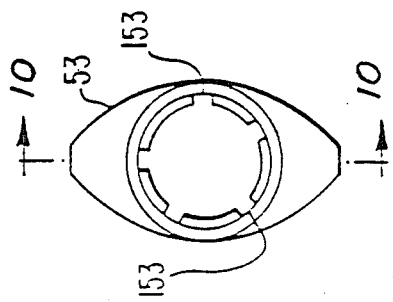
FIG. 10 is a sectional view taken along line 10—10 of FIG. 9.

FIG. 10 is a sectional view taken along line 10—10 of FIG. 9, showing the interior rounded surface of the paddle 53 as well as a true elevational view of the slot 153 visible in this view.

Figure 11:
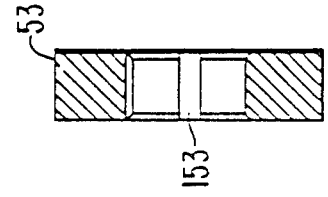
FIG. 11 is a front elevational view of a pair of paddles in rotary relationship during operation.

FIG. 11 is a schematic view of a pair of paddles 55, 55, rotating on respective twin screw shafts (shafts not shown in FIG. 11). Arrows indicate the direction of rotation of the paddles 55, 55. As seen in FIG. 9, the paddles exhibit during rotating a "wiping" action which results in positive material flow through the extruder, as well as self-wiping which results in self-cleaning during operation of the paddles. The other paddles 53, 56, 58, and 59, also are self-wiping in the preferred embodiment.

Figure 12:
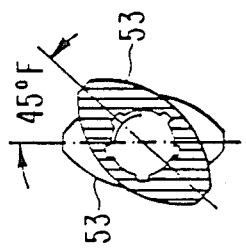
FIG. 12 is a front elevational view, partially in section, of a pair of paddles mounted upon the same shaft.

FIG. 12 is a front elevational view, partially in section, showing the 45 degree angle F orientation of two consecutive paddles 53, 53 mounted upon a single one of the two shafts.

Figure 13:
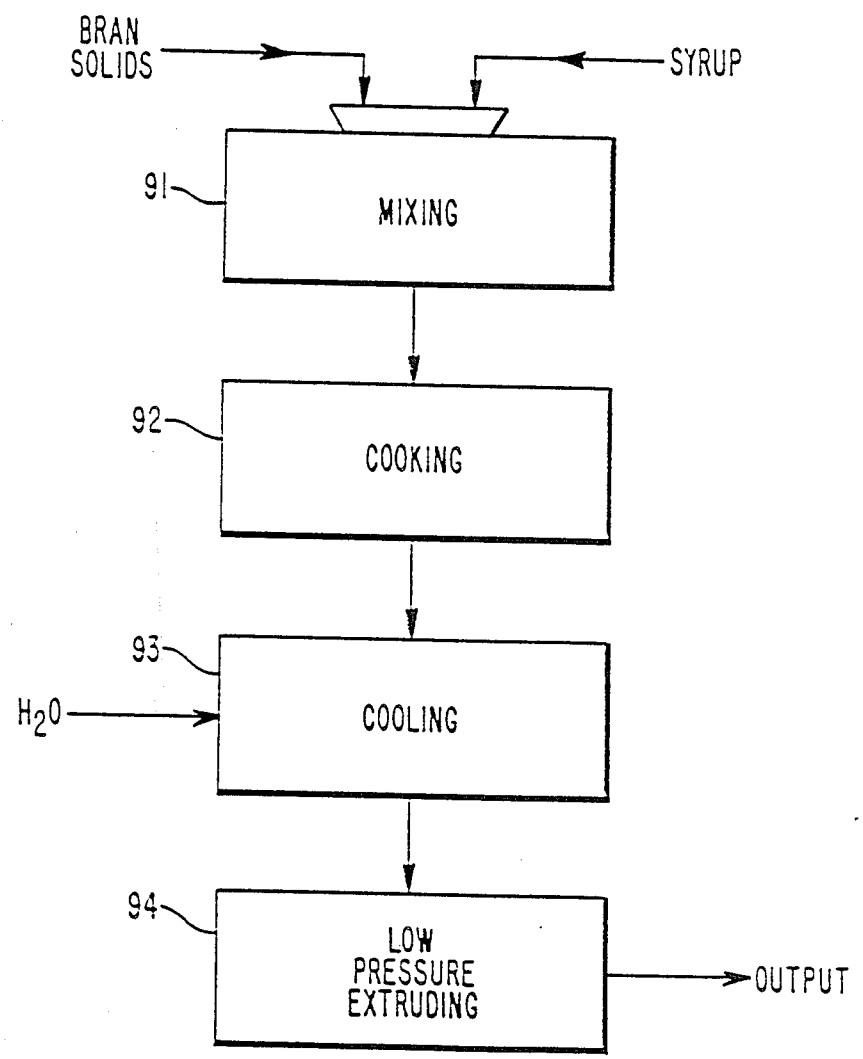
FIG. 13 is a process diagram showing the present invention.

FIG. 13 is a process diagram of the process according to the present invention. Here, bran solids and syrup are added as indicated at 91 and mixed. The syrup contains from 20%-90% "brix" (solids). The mixture is then cooked at a cooking step 92. The cooked material is then cooled at a cooling step 93 by the injection of liquid water. No water had been directly added prior to the cooling step 93. Only the moisture already present in the bran solids and in the syrup existed in the cooked material prior to the cooling step.

The cooled mixture is then extruded at low pressure, of approximately 1–100 psi at the extruding step 94. The extrudate is then the output as seen in FIG. 11. The output is composed of strands of bran extrudate. The strands are in pieces of approximately 0.5 to 4.5 inches in length and approximately 0.093 inches in diameter.

If extra water is added with the syrup, there is little control over the final composition as to sugar, vitamin characterisitics, and bulk density which vary depending upon the particular bran and other materials used. The water injected during the cooling step controls bulk density well, to within 5% of the desired bulk density. The extruded product is dried to approximately 4–5% moisture by weight, and is then preferably toasted in a toasting oven for providing the desired color, flavor and crispiness characteristics.

Gelatinization of the starches present in the syrup-and-dry-ingredient mixture occurs, however the materials present produce little gelatinization due to the high bran content.

The final product bulk density of the extrudate is preferably approximately 15 to 15.5 pounds per cubic foot. This is controllable in a range of from 12.5–20 lbs/ft$^3$. There is significantly better blending and mixing of the ingredients during the mixing, cooking, and cooling steps of the present invention, as compared to the prior art method. This is believed to cause the significantly better taste of the bran cereal nuggets produced by the present invention as compared to the prior art bran buds.

The introduction of water 7 through conduit 9 into the cooling zone 23 causes a reduction in temperature of the material from a range of 200°–400° F. to a range of about 150° F.–250° F. This temperature drop occurs in approximately 15 seconds, the residence time of the material passing through the cooling zone. This temperature drop causes a sharp reduction in the amount of expansion of the material. If no expansion occurred, the extrudate surface would be very smooth, like spaghetti strands, and would be approximately twice as dense as the desired final product. The space X between the final conveyor screw (pusher screw) and the die head is approximately 3½ inches in distance, as measured in a direction parallel to the axis of the screw shown in FIG. 3. This depth, X, is not critical and can be varied as desired, so long as sufficient head space is present to permit a sufficiently low extrudate extrusion temperature to produce an extrudate having roughened surface characteristics. This space permits a drop in pressure of the material to be extruded at just above atmospheric pressure, at just above 14.7 p.s.i (absolute). Thus, there are a correspondingly sufficient number of holes in the die head 11 to permit extrusion at such a relatively low extrusion pressure.

The cooling effect of the water 7 added in the cooling zone 23 also causes the viscosity of the cooked material to increase, thereby causing the holes 12 to "tear up" the surface of the extrudate material. This roughened surface results in a pleasing mouthfeel and in a pleasing visual appearance. The water injection also contributes to the greater bulk density (by decreasing expansion) and to the crispiness and chewable texture of the final extrudate product.

Other types of bran usable in the present invention include barley bran, oat bran, corn bran, wheat bran, as well as any other types of bran.

The actual ratio of the length to the diameter of the extruder shaft from beginning to end is approximately 15/1. The extrudate need not be used directly in the bud form, but can be further processed into powder, flakes, or other products by further operations if desired, prior to or after the drying and toasting steps. The length to diameter ratio mentioned above can be in a range of 5:1 to 100:1 if desired. Other length to diameter ratios are possible, and all such variants are contemplated as being within the scope of the present invention.

Combinations of bran can also be used in the present invention, for example wheat bran can be used in a proportion of, for example, 70% by weight to 30% of corn bran. All other combinations of different brans are contemplated as being within the scope of the present invention. Other ingredients, such as wheat flour or other flours, fruit solids, and the like, can also be used together with the bran in the present invention.

The mixing paddles used to mix the syrup with the dry ingredients are used for thorough mixing since the syrup is absorbed slowly. The syrup may be, for example, 66% solids ("66 brix"), with liquid sugar, water, vitamins, and/or flavoring constituting the remaining 34% of the syrup. The syrup can range from 40–80% net solids if desired.

The barrel or diameter in the preferred embodiment is 50 millimeters. Other sizes can be used as well. The die has a diameter of approximately 2½ inches, and a cavity depth of approximately one inch.

In the cooking zone, starches are gelatinized, sugars are caramelized, and flavors are developed. Since the cooking time and pressure, as well as cooking temperature, are all controllable, the degree of starch gelatinization, sugar caramelization, texture and/or flavor development are all controllable. Furthermore, an artificially sweetened or non-sugar product can also be produced if desired.

If the surface of the extrudate is not roughened, the product would be perceived by some individuals as undesirably too hard to the bite, especially older consumers, having missing teeth, who would find such a product too hard to the bite. There would not be a good mouthfeel, and the bulk density would be too high.

The residence time of the cooked material in the cooling zone is approximately 10 seconds. This residence time is far too short to permit cooling by usual methods, such as circulation of cooled water about the barrel. Thus, direct water injection at the cooling zone is necessary for the rapid and complete cooling to approximately a range of 150° F.–250° F., preferably required in the present invention.

The improved process, apparatus, and product of the present invention are capable of achieving the above-discussed advantages, and while preferred embodiments of the present invention have been disclosed, it will be understood that it is not limited thereto, but may be otherwise embodied within the scope of the following claims.

What is claimed is:

1. A continuous process for producing a comestible bran cereal, comprising the steps of:
    (a) blending dry ingredients comprising at least one cereal bran with syrup to form a mixture;

(b) cooking said mixture;
(c) cooling the cooked mixture by direct injection of water into said mixture; and
(d) extruding the cooled product into strands which spontaneously break into lengths of approximately 0.5 to 4 inches, said cereal having a visibly roughened surface.

2. A process as claimed in claim 1, further comprising the steps of:
(e) drying the extrudate; and
(f) toasting the dried extrudate.

3. A method as claimed in claim 1, wherein said at least one cereal bran consists essentially of at least one of wheat bran and corn bran.

4. A continuous method for forming bran cereal nuggets, comprising:
blending dry ingredients comprising at least one cereal bran with syrup to form a mixture;
cooking the mixture to form a cooked material;
injecting water into the cooked material to rapidly cool the material; and
extruding the cooled material into strands which spontaneously break into relatively short lengths, such that each strand has a visibly roughened surface.

5. A method for forming bran nuggets as claimed in claim 4, wherein a twin screw extruder is used to perform the blending step, the cooking step, and the cooling step;
the cooled material being extruded through a die head having a plurality of orifices therein.

6. A method for forming bran buds as claimed in claim 4, wherein the cooking takes place within a temperature range of 200° F.–400° F.

7. A method for forming bran nuggets as claimed in claim 4, wherein the mixture is cooled to within a range of 200° F.–290° F. by the injection of water at the cooling step.

8. A method for forming bran nuggets as claimed in claim 4, wherein the extruded strands spontaneously form lengths of from 0.5 inch to 4 inches in length; and further including the step of drying the strands.

9. A method for forming bran nuggets as claimed in claim 8, further including the step of toasting the dried strands.

10. A method as claimed in claim 4, wherein said at least one cereal bran is selected from the group consisting of wheat bran, corn bran, rye bran, oat bran, barley bran, rice bran and grain sorghum bran.

* * * * *